US008531520B2

(12) United States Patent
Stricklin et al.

(10) Patent No.: US 8,531,520 B2
(45) Date of Patent: Sep. 10, 2013

(54) SYSTEM AND METHOD FOR TRAFFIC MONITORING

(75) Inventors: Michael C. Stricklin, Austin, TX (US); Dean W. Teffer, Austin, TX (US); John Filo, Austin, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 0 days.

(21) Appl. No.: 10/117,003

(22) Filed: Apr. 5, 2002

(65) Prior Publication Data

US 2003/0189499 A1 Oct. 9, 2003

(51) Int. Cl.
*H04N 7/18* (2006.01)

(52) U.S. Cl.
USPC .......................................................... 348/143

(58) Field of Classification Search
USPC ................. 348/143, 148, 149; 382/103, 104, 382/105
See application file for complete search history.

(56) References Cited

U.S. PATENT DOCUMENTS

| | | | | |
|---|---|---|---|---|
| 5,948,038 | A * | 9/1999 | Daly et al. | 701/117 |
| 6,111,523 | A * | 8/2000 | Mee | 340/937 |
| 6,281,808 | B1 * | 8/2001 | Glier et al. | 340/933 |
| 6,466,260 | B1 * | 10/2002 | Hatae et al. | 348/149 |
| 6,546,119 | B2 * | 4/2003 | Ciolli et al. | 382/104 |

* cited by examiner

*Primary Examiner* — Chikaodili E Anyikire

(57) ABSTRACT

The invention is directed to a system and method for acquiring image evidence of traffic violations. The system has a controller, an image acquisition system, and sensors. The controller acquires data from the sensors to determine the likelihood of a traffic violation. The controller determines a schedule for acquiring images associated with the violation. Multiple images may be acquired as evidence of the violation. The controller then directs the image acquisition to acquire images in compliance with the schedule. The controller may then package, encrypt, and authenticate data and images associated with the violation. The controller may then transfer the data to a remote location. The system may also determine a schedule to acquire images associated with multiple violations and/or traffic accidents.

27 Claims, 16 Drawing Sheets

SYSTEM AND METHOD FOR TRAFFIC MONITORING

STATEMENT REGARDING FEDERALLY SPONSORED RESEARCH OR DEVELOPMENT

The U.S. Government may have a paid-up license in this invention and the right in limited circumstances to require the patent owner to license others on reasonable terms as provided for by the terms of contract No. DTRS57-04-C-10006 Phase I and/or DTRS57-05-C-10022 Phase II) awarded by the U.S. Department of Transportation.

FIELD OF THE INVENTION

This invention, in general, relates to a system and method for automatically capturing data associated with traffic violations. More specifically, this invention relates to a system and method for capturing images for use as evidence of multiple traffic law violations.

BACKGROUND OF THE INVENTION

Traffic violations represent a significant hazard to public safety. These violations include running red lights, running stop signs and speeding, among others. Deterring traffic violations could significantly improve public safety. In addition, citations issued to traffic violators could enhance municipal revenue.

For example, violators who run red lights represent a particular danger to the public. Running red lights can lead to accidents. These accidents can lead to further traffic delays. Moreover, these accidents can lead to large property damages, medical bills, and loss of life.

However, many red light violations go undetected. As many as one percent of vehicles may violate a red light. In a large municipality, as many 20,000 cars may traverse an intersection in any one day. Therefore, as many as 200 violations per intersection may occur in any given day.

Not only does the number of red light violations represent a significant danger to the public, failure to issue citations associated with these violations represents a significant revenue loss to the municipality. Citations issued to traffic law violators are typically a significant revenue stream in many municipalities. A large number of undetected violations means a large number of citations are not written. However, many typical methods for detecting and issuing citations would be cost prohibitive.

Furthermore, evidence of violations is often qualitative. For example, a person running a red light may be cited by an officer for that violation. The evidence of a violation is the witnessing of the act by the officer. Alternately, if the traffic violation were to result in an accident, the evidence may be limited to the perception of the witnesses or participants. As such, many violators in their defense may call into question the recall of the officer or witnesses. Moreover, in the case of the officer, the officer may have a significant number of cases and recall of many of these cases may be impractical.

As such, many typical methods for detecting and citing traffic violators suffer from deficiencies in both detecting violations and providing evidence of the violations. Many other problems and disadvantages of the prior art will become apparent to one skilled in the art after comparing such prior art with the present inventions as described herein.

SUMMARY OF THE INVENTION

Aspects of the invention may be found in a system for detecting traffic violations. The system may include an image acquisition system, sensors for detecting vehicles and a controller. The sensors may communicate with the controller. The controller may direct the image acquisition system to acquire an image. The controller may then store the image.

Further aspects of the invention may be found in the system having an interface to a traffic light system and/or an interface to an interconnected network. The controller may be in communication with the traffic light system. For example, when a light is red, the controller may direct the image acquisition system to acquire an image of one or more vehicles traversing the red light. Furthermore, the controller may direct the downloading of that image and/or data associated with the traffic violation through the interconnected network to a remote location.

Further aspects of the invention may be found in a back-office system. The back-office system may include one or more interfaces to a network, temporary storage for images and data associated with traffic violations, and a data server, among others. A back-office system may also include report servers, citation processing servers and administrative servers. Furthermore, these servers may be coupled or accessible through an interconnected network. For example, a browser may be able to connect through an interconnected network to the report servers, processing server, and administrative server. The browser and/or servers may communicate using various encryption and/or security algorithms.

Other aspects of the invention may be found in a system for accessing traffic violation data. The system may include one or more databases, a security management system and a dynamic query engine. The dynamic query engines may enable traffic violation data to be viewed through various user interfaces. These user interfaces may include raw data interfaces, intersection information, processed violation viewing, raw violation image and data viewing, traffic and violation data reports and analysis, among others. Furthermore, access to the databases may be restricted through the security management system using a user logon, password, or identifying token, among other security management methods.

Aspects of the invention may also be found in a method for detecting traffic violations. The method may include sensing a vehicle and/or the vehicle's motion using one or more sensors, determining a preferred time at which an image will be taken, acquiring an image at or near the preferred time and storing the image. For example, the sensors may detect one or more vehicles moving towards an intersection at which a light is red. Data from the sensors may be used to determine the velocity and/or acceleration of the one or more vehicles. The controller may then determine a preferred time for acquiring an image of the one or more vehicles. In addition, the controller may determine a preferred time for acquiring a second image of the one or more vehicles. In this manner, the vehicles may be shown to be moving through the intersection while the light is red.

Further aspects of the invention may be found in a method for detecting and acquiring images relating to one or more violations occurring in proximity. For example, two vehicles may be approaching a light that is red. The sensors may detect the two vehicles. The data from the sensors may be used by the controller to determine the velocity of the two vehicles. Further, the controller may determine a preferred time for taking a first and or second image of the vehicles. For example, the first vehicle may be approaching the intersection at which time an image is scheduled. A second vehicle may be approaching the intersection. The controller may determine whether a single image may be used to represent the violation of both vehicles simultaneously. For example, if the violation by the second car occurs closely following the violation of the first car, then a single image may be taken for the first image and/or second image. Alternately, if the second vehicle runs the red light significantly after the first vehicle, an image may be taken which represents a second image taken for the first violation and a first image for the second violation.

Further aspects of the invention may be found in a method for authenticating traffic violation data. The method may include time stamping images and data. Further, the method may include wrapping or encrypting data and time stamping the wrapped, encrypted, or packaged data. The images and/or data may be time stamped using the time from a clock in the controller, or time data acquired through an interconnected network, among others. Furthermore, authentication of images, data or data packages may be formed through use of a public and/or private key encryption.

Further aspects of the invention may be found in transferring traffic violation data and/or traffic violation packages through an interconnected network. The data may be transferred immediately following the violation, at scheduled intervals, on command, as the storage medium for storing the violation data exceeds a volume threshold, or a combination of methods, among others.

As such, a system for detecting and issuing citations associated with traffic violations is described. Other aspects, advantages and novelties of the present invention will become apparent from the detailed description of the invention when considered in conjunction with the accompanying drawings.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION

Figure 1:
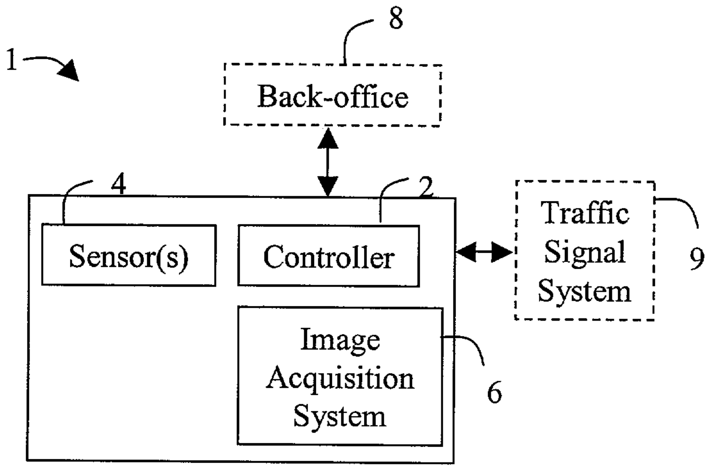
FIG. 1 is a schematic block diagram of a system for detecting traffic violations, according to the invention.

FIG. 1 is a schematic block diagram of a system for detecting traffic violations according to the invention. The system 1 has a controller 2, a sensor 4 and an image acquisition system 6. The system 1 may also have a back-office 8 and a traffic signal 9. The sensor 4, the image acquisition system 6, and the traffic signal 9 may be connected to the controller 2. Similarly, the back office 8 may be connected to the controller 2. However, these elements may be added, subtracted, or connected in various configurations. For example, the system 1 may or may not include the traffic signal 9 and a back office 8.

The sensors 4 may detect a vehicle or vehicles. The sensor 4 may communicate data associated with the vehicle or vehicles to the controller 2. The controller 2 may determine whether a violation has or is likely to occur. Further, the controller 2 may schedule a time for the acquisition of one or more images associated with the violation using the image acquisition system 6. Furthermore, the controller 2 may use the traffic signal interface 9 to determine whether a violation has occurred.

The controller may use limitations associated with the image acquisition system 6 in scheduling the acquisition of an image. For example, the camera may have a limitations on the number of images that may be acquired over a given period of time. The camera may also require a reset period or have limits on storage. In addition, image acquisition may take a time interval. If two images were to be scheduled in close proximity, the camera may not be able to acquire both.

The controller 2 may acquire one or more images and data associated with the traffic violation. These images and data may be packaged, authenticated, and/or encrypted. Then, the controller 2 may transfer the package, data, and/or images associated with the traffic violation to the back office 8.

In addition, the controller 2 may receive data and/or configuration data from the back-office 8 or another device. In this manner, the operation of the controller 2, the sensors 4 and the image acquisition system may be changed from a remote location or with a mobile or handheld device.

In another exemplary embodiment, the controller 2 may collect all data associated with traffic. This data may be associated with the number of vehicles, the type of vehicles, the number of violations, the type of violations, and daily traffic patterns, among others. However, various data may be collected by the controller 2 and transferred to the back-office 8. In this manner, the system 2 may provide real time engineering metrics, enforcement metrics, and meta-data tracking.

The sensor 4 may take various forms. These forms may include tire sensors, pressure sensors, pneumatic sensors, electromagnetic induction sensors, motion detectors, electromagnetic sensors, magnetic sensors, and optical sensors, among others.

The image acquisition system 6 may take various forms. These forms may include digital cameras, digital video cameras, and infrared cameras, among others. Further, the image acquisition system 6 may or may not include a means of illumination. The means may take various forms. These forms may include a flash, a light bulb, an infrared light, and a street lamp, among others.

The sensor 4, image acquisition system 6, and traffic signal 9 may be connected to the controller 2 through various means. These means may include various hardwired and wireless methods. The controller 2 may be connected to the back office 8 through an interconnected network. This interconnected network may take the form of a global network, a wireless network, a local area network, and/or a wide area network, among others. Further, the interconnected network may include any combination of networks.

However, each of these elements may be arranged and coupled in various configurations. Moreover, the elements may be together, separate or in various combinations, among others.

Figure 2A:
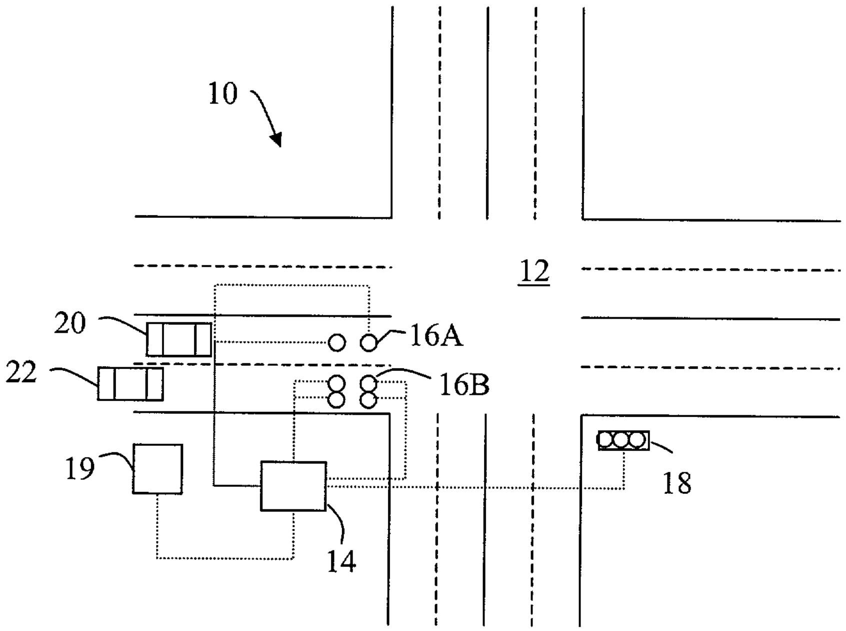
FIG. 2A is a schematic diagram of an exemplary embodiment of the system as seen in FIG. 1.

FIG. 2A is a schematic block diagram of an exemplary embodiment of the system according to FIG. 1. In this exemplary embodiment 10 an intersection is shown 12. On at least one approach to the intersection 12, sensors 16A and 16B may, for example, be placed in, on or about the road. Moreover, these sensors 16A and 16B may be placed in adjoining lanes. The sensors may detect one or more vehicles 20 and 22 approaching the intersection. The sensors 16A and 16B may signal the controller 14 with data associated the vehicles 20 and 22. Furthermore, the controller 14 may acquire data from the traffic signal system 18. The controller 14 may determine if a violation has occurred or is likely to occur and may schedule one or more to be images to be acquired by image acquisition system 19.

For example, a vehicle 20 may approach a red traffic signal 18. The sensor(s) 16A may detect and send data associated with the travel of the vehicle 20 to the controller 14. The controller 14 may determine that a violation has occurred or is likely to occur. For example, the controller 14 may measure or determine the speed and or magnitude of acceleration of the vehicle 20 and ascertain the likelihood of the vehicle 20 running a red light 18. The controller 14 may then schedule an image to be taken by the image acquisition system 19. In addition, controller 14 may schedule a second image to be taken by the image acquisition system 19. In combination, the two images and the data collected associated with the vehicle 20 may be packaged and authenticated for use as evidence of the violation. The package may be stored at controller 14 and/or sent to a remote location.

In another example, a vehicle 22 may approach the intersection 12 near the time when vehicle 20 approaches the intersection 12. Similarly, sensor(s) 16B may detect the vehicle 22 and send data associated with the vehicle 22 to the controller 14. The controller 14 may use data from the traffic signal 18 to determine whether a violation is likely to or has occurred. The controller 14 may then schedule an image to be taken by the image acquisition system 19. Moreover, the controller 14 may determine whether an image taken to record the violation of a vehicle 20 may be used as evidence for the traffic violation of vehicle 22. As such, the controller 14 may use data associated with vehicle 20 and vehicle 22 to determine a schedule for image acquisition by the image acquisition system 19. The controller 14 may then package and/or authenticate the images and data associated with each violation in combination or separately, among others. The package or packages may be stored by controller 14 and/or may be transferred to a remote location.

In a further exemplary embodiment, the system may detect one or more violations such as those described for the vehicles 20 and 22. The system may then process a violation and communicate data associated with the violation to an enforcement agent. The enforcement agent may, for example, be at the intersection or beyond the intersection. In this manner, the enforcement agent may receive notice of the violation and take action. For example, the enforcement agent may be a police officer with a mobile unit. The system may send data associated with one or more violations to the mobile unit. The unit may process a ticket or perform other functions associated with enforcement. However, various uses may be envisaged.

The sensors 16A and 16B may be of the same type, a different type, various combinations of type and various configurations, among others. Furthermore, the elements, the sensors 16A and 16B, the image acquisition system 19, the controller 14, and/or the traffic system 18, may be combined, separate, or in various configurations, among others.

Figure 2B:
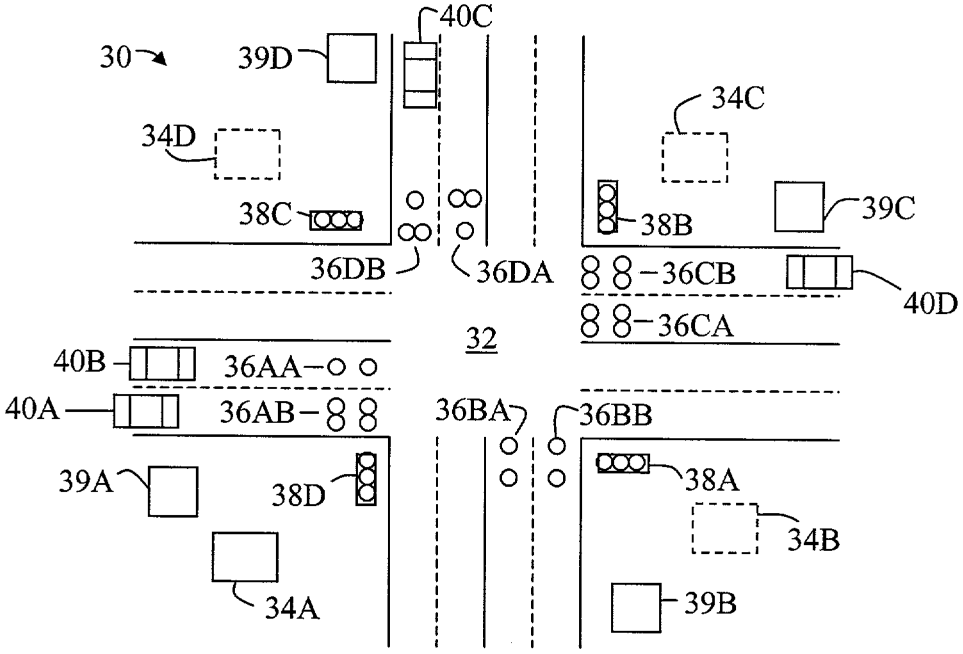
FIG. 2B is a schematic diagram of a further exemplary embodiment of the system as seen in FIG. 1.

FIG. 2B is another schematic block diagram of a further exemplary embodiment of the system as seen in FIG. 1. The system 30 may have a controller 34A, cameras 39A, 39B, 39C, and 39D, sensors 36AA, 36AB, 36BA, 36BB, 36CA, 36CB, 36DA, and 36DB, and signals 38A, 38B, 38C, and 38D, among others. Furthermore, the system 30 may or may not have multiple controllers 34B, 34C, and 34D.

Each of these elements may be associated together, separately or in various combinations, among others. For example, the traffic signal systems 38A, 38B, 38C, and 38D may be a single unit and/or have a single interface. In another example a single controller 34A may function to observe all sensors and traffic signals. In a further embodiment, a single controller may direct each image acquisition system 39A, 39B, 39C, and 39D. However, various configurations may be envisaged.

The sensors 36AA, 36AB, 36BA, 36BB, 36CA, 36CB, 36DA, and 36DB may be associated with various lanes leading to an intersection 32. These sensors may take various forms. These forms may include tire sensors, pressure sensors, pneumatic sensors, electromagnetic induction sensors, motion detectors, magnetic sensors, electromagnetic sensors, and optical sensors, among others. In addition, each lane may have a same type of sensor, different sensors, or various combinations of sensors, among others.

The controller or controllers may function to gather data associated with traffic violations. From the sensors 36AA, 36AB, 36BA, 36BB, 36CA, 36CB, 36DA, and 36DB and traffic signal systems 38A, 38B, 38C, and 38D, the controller or controllers may then schedule images to be taken by the image acquisition systems 39A, 39B, 39C, and 39D. The data and images may then be packaged, authenticated, and stored in the controller or controllers 34A, 34B, 34C, and 34D. Further, the data or packages may be sent to a remote location by the controller or controllers 34A, 34B, 34C, and 34D.

In one exemplary embodiment, two vehicles 40A and 40B, approach an intersection 32. The vehicle 40B is detected by sensors 36AA prior to sensors 36AB detecting the vehicle 40A. The information may be gathered in conjunction with information from the traffic signal system 38A. The controller 34A may then determine that a violation is likely to or has occurred for each of the vehicles 40A 40B. The controller 34A may then schedule images to be taken by image acquisition system 39A. The images may be used as evidence showing the violations of both vehicles 40A and 40B. The evidence data and images may then be packaged, encrypted, and/or authenticated by the controller 34A. Furthermore, the evidence may be stored by the controller 34A and sent to a remote location.

In an alternate embodiment, a vehicle 40B may approach the intersection 32. In addition, a vehicle 40D may approach an intersection 32. The sensors 36AA may detect the approach of the vehicle 40D and the sensors 36CB may detect the approach of the vehicle 40D. A controller 34A may gather the information associated with the vehicles 40B and 40D. In conjunction with data from traffic signal systems 38A and 36C, the controller may determine the likelihood or the actuality of a violation. The controller may then schedule images to be taken by the image acquisition systems 39A and 39C. These images may be scheduled such that evidence is available for the violations of both vehicles 40B and 40D. For example, the image acquisition system 39A may take two images of the vehicle 40B traveling through the intersection 32. Similarly, the image acquisition system 39C may take two images of the vehicle 40D traveling through the intersection 32. Alternately, the image acquisition system 39A may take two images encompassing both vehicles traveling through the intersection 32 or, image acquisition system 39B may take images of both vehicles traveling through intersection 32. Furthermore, image acquisition system 39A may take a first image. An image acquisition system 39C may take a second image. However, these image acquisition systems may operate separately, in conjunction, or in various combinations to produce image evidence of the traffic violations of the vehicles 40B and 40D. The images may be packaged in various combinations by the controller 34A and stored. Further, the controller 34A may send the packages to a remote location.

The controllers 34A, 34B, 34C, and 34D may communicate through various means. These means may include a hardwired and/or wireless means. Through this communication, the controllers may coordinate actions. For example, the controllers may coordinate the acquisition of images for a violation and/or accident through a wireless means such as 802.11 wireless ethernet.

In another exemplary embodiment, the controllers may communicate with a third party. The third party may, for example, be an enforcer or witness associated with an enforcer. For example, the controller 34A and/or controllers 34B, 34C, and 34D may communicate with a mobile device through an 802.11 wireless ethernet connection or other wireless connection. The mobile device may permit configuration of the controllers 34A, 34B, 34C, and 34D, receive alerts associated with accidents and/or violations, process accident and/or violation reports, and print reports. However, various wireless method may be utilized. Furthermore, various functions may be envisaged.

In an alternate embodiment, two cars 40B and 40C may be approaching the intersection 32. The sensors 36AA may detect the vehicle 40B and the sensors 36DB may detect the vehicle 40C. The controller 34A may gather the sensor data from the sensors 36AA and 36DB. Further, the controller 34A may gather information from the traffic systems 38A and 38D. From the traffic system data and sensor data, the controller 34A may determine that an accident is likely to or has occurred. The controller 34A may then schedule images to be acquired by image acquisition systems 39A and 39D. These images may then be packaged to both show a traffic violation and an accident. As such, these images may be used as evidence of both the traffic violation and in determining who is at fault in an accident. The images may be packaged, authenticated, watermarked, and/or encrypted for use as evidence of the accident or traffic violations, individually or in combination. The packages may be stored in a controller 34A. Further, the packages may be transferred to a remote location by the controller 34A.

However, various configurations may exist. For example, the traffic systems 38A, 38B, 38C and 38D may or may not be housed as one unit. Further, more than one controller may be used at the intersection 32. Moreover, various image acquisition systems may be placed in varying locations around the intersection 32. As such, many alternate embodiments may be envisaged for detecting traffic violations.

Figure 2C:
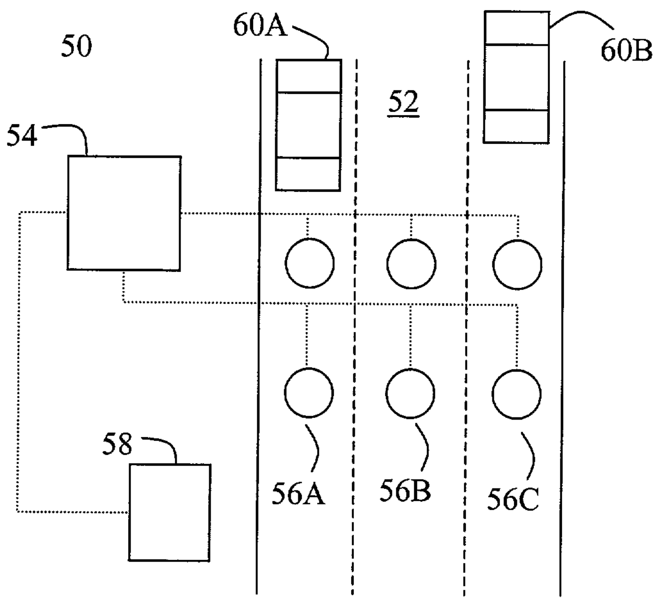
FIG. 2C is a schematic diagram of another exemplary embodiment of the system as seen in FIG. 1.

FIG. 2C is a schematic diagram of an exemplary embodiment of the system as seen in FIG. 1. In the system 50, sensors 56A, 56B, and 56C may be located in, on or about various lanes within a road 52. The sensors may detect vehicles, such as the vehicles 60A and 60B as shown. The controller 54 may gather the data from the sensors 56A, 56B, and 56C. The controller may determine that a violation has occurred or is likely to occur and may schedule images to be taken by an image acquisition system 58.

For example, a vehicle 60A may be traveling on the road 52. Sensors 56A may detect the vehicle 60A traveling at an excessive speed. The controller 54 may determine that the speed of vehicle 60A exceeds the speed limit. As such, the controller 54 may direct or schedule images to be taken by the image acquisition system 58. The images may then be packaged, encrypted, and/or authenticated by the controller 54 and stored. Further, the package may be sent to a remote location by the controller 54.

In another exemplary embodiment, two vehicles 60A and 60B are traveling on the road 52. Sensors 56A and 56C may detect the vehicles traveling at an excessive speed. The controller 54 may gather the data associated with the sensors 56A and 56C. The controller 54 may then schedule images to be taken by the image acquisition system 58. The image acquisition system 58 may then take images of one or both vehicles according to the image schedule. These images may be packaged separately or in combinations associated with the individual violations by the controller 54 and stored. Further, the packages, images and data may be sent to a remote location. In this manner, more than one speeding violation may be cited.

In a further example, an enforcement agent may receive data associated with violations. The enforcement agent may, for example, have a mobile unit which receives data from the system. The mobile unit may function to alert the enforcement agent, process violations, and prepare tickets, among others. In this manner a real time interactive ticketing system may be realized.

However, FIGS. 2A, 2B, and 2C are exemplary embodiments of the system as seen in FIG. 1. Other embodiments may be envisaged. For example, a parking violation system may be envisaged. Alternately, a system for determining "No Right Turn on Red" and/or "No U-turn" violations may be envisaged. Further, a system for multiple violations of multiple types across multiple lanes may be envisaged.

Figure 3A:
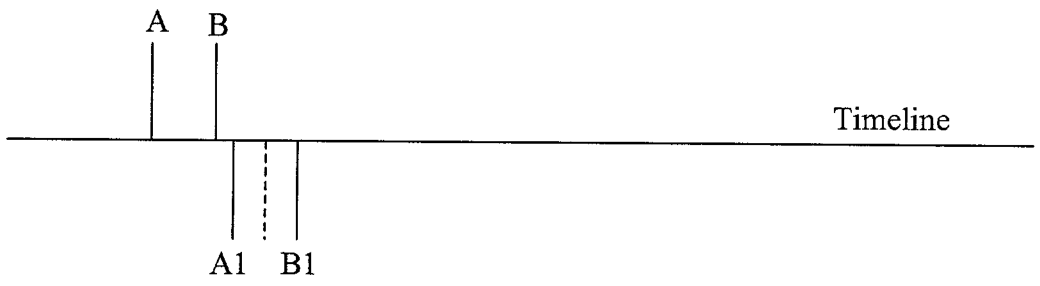
FIG. 3A is a timeline of an exemplary method for use by the system as seen in FIG. 1.

FIG. 3A is a timeline of an exemplary embodiment of the system as seen in FIG. 1. A vehicle A is determined to have or be likely to violate a traffic law at a time denoted by the line A on top of the timeline. Similarly, a vehicle B is determined to have committed a violation at a time denoted by the line B. A controller may determine that the preferred image depicting the violation of vehicle A should be taken at a time A1. Similarly, the controller may determine that a preferred image associated with the violation of vehicle B should be taken at a time B1. However, the controller may determine that an image depicting both violations may be taken at a time denoted by the broken line. As such, a controller may direct that the image may be taken at a time denoted by the broken line for use in as evidence of the violation by both vehicles.

Figure 3B:
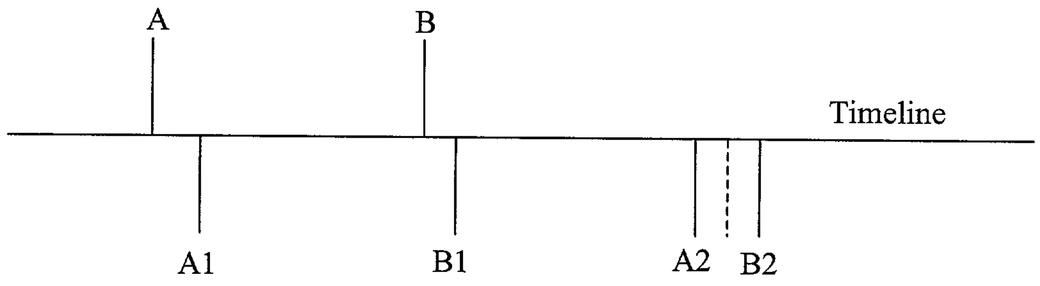
FIG. 3B is a timeline of an exemplary method for use by the system as seen in FIG. 1.

In a further exemplary embodiment, FIG. 3B depicts a timeline associated with the system as seen in FIG. 1. In FIG. 3B, a controller may determine that a violation has or is likely to occur by a vehicle A at a first time as depicted by the line A.

The controller may direct that an image be taken at a time A1. The image may be used as a first image depicting a violation by the vehicle A. A second vehicle B may violate a traffic law at a second time B. The controller may schedule an image to be taken at the time B1 and the image be associated with the violation of B. The controller may then determine that a second image of violation A may be taken at a time A1 and/or that a second image of violation B be taken at a time B2. Further, the controller may determine that a preferred image be taken at a time denoted by the broken line. The preferred image may be associated with both the violations A and B. The image to be used as the second image in the evidence gathered for the traffic violations of both A and B.

Figure 3C:
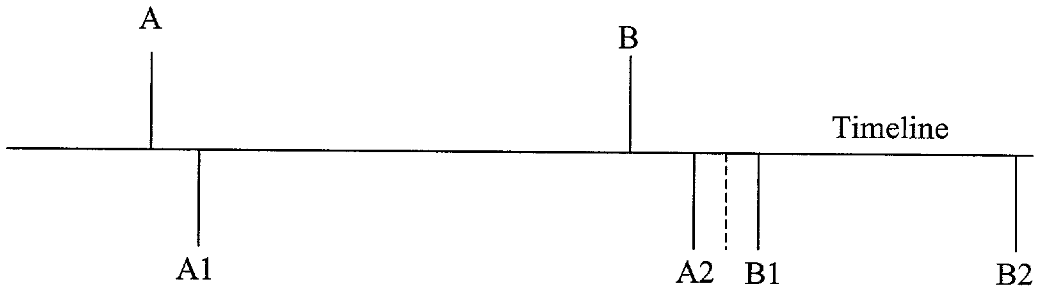
FIG. 3C is a timeline of an exemplary method for use in the system as seen in FIG. 1.

In another exemplary embodiment, FIG. 3C shows an exemplary timeline as may be experienced by the system as seen in FIG. 1. A first vehicle may violate a traffic law at a time A. The controller may determine that a first image in evidence of the violation A be taken at a time A1. The controller may also determine that a second image should be taken at a time A2. At a later time, the vehicle B may violate a traffic law as depicted by the line B. The controller may determine that an image may be taken at a time depicted as B1 to be used as the first image in evidence of the violation of vehicle B. The controller may also determine that an image may be taken at a time depicted by the broken line which may be associated as the second image in the violation A and the first image of violation B. The controller may also direct the image acquisition system to acquire a second image of the violation B as denoted by the line B2.

However, multiple images may be associated with an incident, accident, violation or event. Further, images may be associated with each other in a one-to-another and/or mutual manner.

Figure 4:
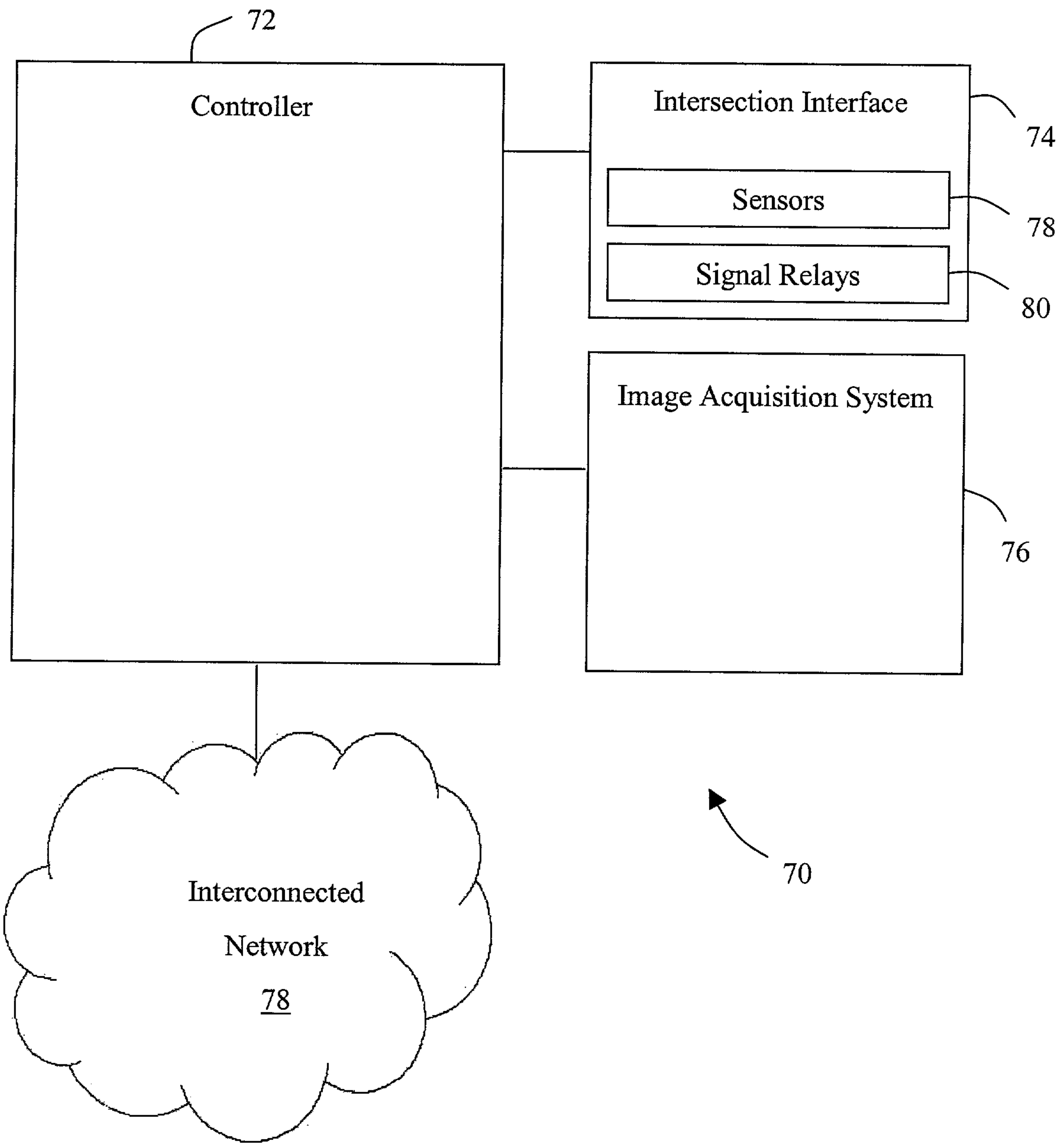
FIG. 4 is a schematic block diagram of an exemplary embodiment of the system as seen in FIG. 1.

FIG. 4 is a schematic block diagram of an exemplary embodiment of the system as seen in FIG. 1. The system 70 may have a controller 72 and an image acquisition system 76. A controller may also communicate with an intersection interface 74. The intersection interface 74 may have sensors 78 and signal relays 80. Further, the controller 72 may be connected to an interconnected network 78.

The controller 72 may use information from the sensors 78 and signal relays 80 to determine if a violation has or is likely to occur. The controller 72 may then determine a schedule for acquiring one or more images to use as evidence of the violation. A controller 72 may then direct the image acquisition system 76 to acquire the images according to the schedule. Further, the controller 72 may use data gathered by sensors 78 and signal relays 80 to determine that more than one violation has or is likely to occur. In this case, the controller 72 may establish a schedule for acquiring images to be used as evidence of both violations. The controller 72 may then direct the image acquisition system 76 to acquire the images.

In addition, the controller 72 may package the images and other data associated with the violation or violations. Further, the controller 72 may store the packages, images and data associated with the violation. The controller 72 may also authenticate and/or encrypt the images, data and/or packages. Furthermore, the controller 72 may transfer the images, data and/or packages across the interconnected network 78 to a remote location.

The controller 72 may also interact with the image acquisition system 76 to adjust parameters associated with acquiring quality images. For example, the controller 72 may adjust parameters associated with exposure. In this manner, the image acquisition system 76 may be adapted for variations in light and other factors. Further, the controller 72 may use images to determine the control action. Alternately, the controller may receive configuration data from a remote locations. In another exemplary embodiment, the controller 72 may have a schedule for changing parameters. For example, the controller may vary the exposure in accordance with the time of day. In a further example, the controller 72 may use data from a light sensor or other measuring device in determining the control action.

The controller 72 may be connected to the interconnected network 78 through various means. The means may include a modem, DSL connection, wireless connection, dedicated line connection, cable modem connection, satellite connection, wireless phone connection, and two-way pager system, among others.

However, the system 70 may have various configurations. Some, all or none of these elements may be found in the system. For example, sensors may be located in, on, or around an open road. In another example, each of these elements may be a single unit, separate, or in various other configurations, among others.

Figure 5:
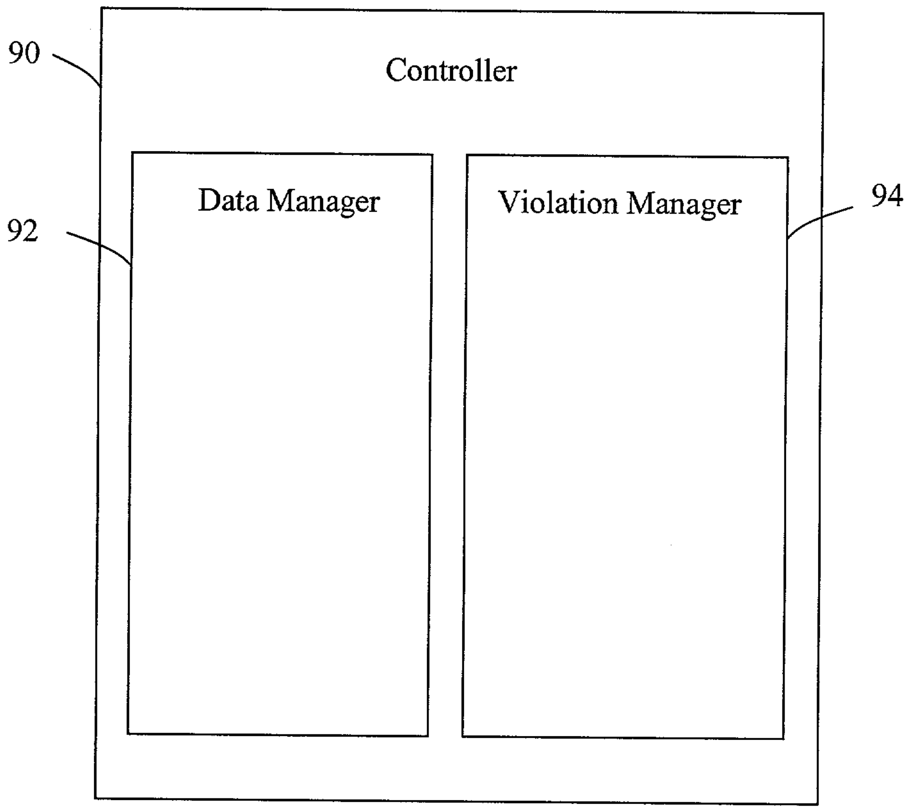
FIG. 5 is a schematic block diagram of an exemplary embodiment of the system as seen in FIG. 4.

FIG. 5 is a schematic block diagram of an exemplary embodiment of the system as seen in FIG. 1. The controller 90 may, for example, have a violation manager 94 and a data manager 92. The violation manager 94 may, for example, function to monitor sensors, determine whether a violation has or is likely to occur and schedule images to be taken, among others. The data manager 92 may function to ensure data integrity, store the data, and manage the transfer of the data to a remote location.

Figure 6:
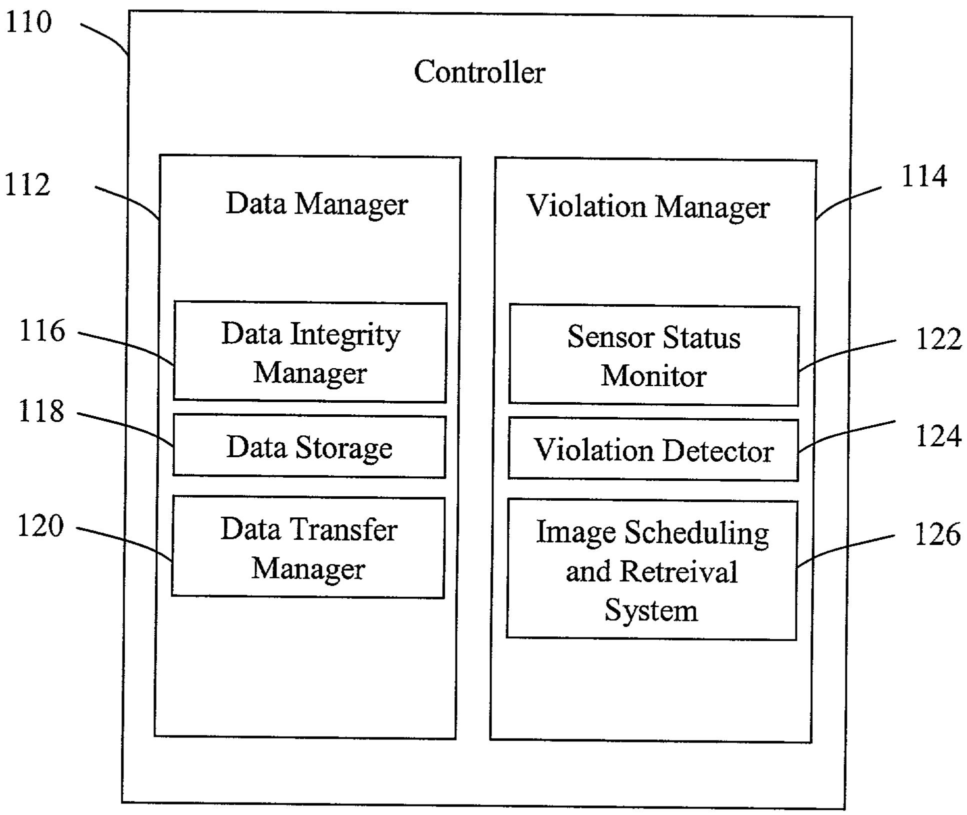
FIG. 6 is a schematic block diagram of an exemplary embodiment of the system as seen in FIG. 5.

FIG. 6 is a schematic block diagram of an exemplary embodiment of the system as seen in FIG. 1. In this exemplary embodiment, the controller 110 has a violation manager 114 and a data manager 112. The violation manager 114 has a sensor status monitor 122, a violation detector 124, and an image scheduling and retrieval system 126. The data manager may, for example, have a data integrity manager 116, a data storage system 118 and a data transfer manager 120, among others.

The sensor status monitor 122 may, for example, gather information from the sensors. In addition, the sensor status monitor 122 may gather data from the traffic system.

The violation detector 124 may use the data from the sensor status monitor 122 to determine whether a violation has or is likely to occur. For example, the sensor status monitor 122 may provide the violation detector 124 with timing data associated with sensor activation. This timing data, may, for example, be used to determine the presence and/or speed of a vehicle approaching a red light. From this data, the violation detector 124 may determine that a violation has or is likely to occur.

The image scheduling and retrieval system 126 may, for example, upon prompting from the violation detector 124, schedule images to be taken as evidence of the violation. The image scheduling and retrieval system 126 may, for example, use the information from the sensor status monitor 122 and/or the violation detector 124 in determining a schedule. The image scheduling and retrieval system 126 may then direct the acquisition of images from an image acquisition system. Further, the image scheduling and retrieval system 126 may retrieve the images.

The data manager 112 may have a data integrity manager 116, a data storage system 118 and a data transfer manager 120. The data integrity manager 116 may function together data and images from the violation manager 114. The data integrity manager may, for example, package, encrypt, and/or authenticate data and images associated with violations.

The data storage 118 may then store data, the images or the packets, among others for future transfer to a remote location.

Further, the data storage may include a write-once media. With the write once media, data may be stored in a tamper resistant format. The data storage 118 may take various forms. These forms may include a flash memory, hard drive, floppy drive, optical storage, and RAM, among others.

The data transfer manager 120 may function to transfer data from the controller to a remote location. The data transfer manager 120 may, for example, transfer data from the data storage system 118. The data transfer manager 120 may transfer data and images and packets as they are created, on a schedule, or on demand, among others. In this manner, real-time access may be provided to data. Alternately, the data may downloaded in accordance with network traffic density.

The data integrity manager 116 may further use various methods for authenticating packets. These methods may include time stamping each image, time stamping compressed packets of images, time stamping compressed packets of data and images, and encrypting packets using PKI, among others. Further, the data integrity manager 116 may use an internal clock, verify time through the interconnected network, or acquire a key, among others, for use in authenticating packets.

Figure 7:
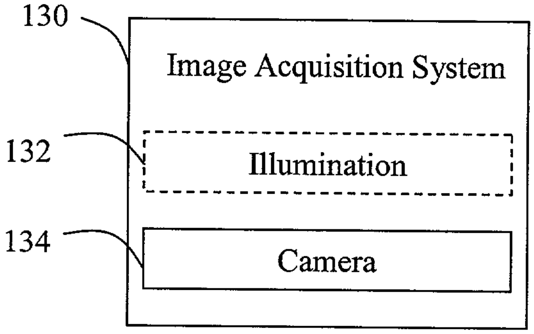
FIG. 7 is a schematic block diagram of an exemplary embodiment of the system as seen in FIG. 4.

FIG. 7 is a block diagram of an exemplary embodiment of an image acquisition system as seen in FIG. 1. The image acquisition system 130 may have a camera 134. In addition, image acquisition system 130 may have illumination 132.

The camera may take various forms. These forms may include a digital camera, a digital video camera, and an infrared camera, among others. Further the camera may be associated with a frame grabber. Together or separately, the camera and/or frame grabber may enable features such as ultra-high resolution (>1.3 M Pixels), stable color intensity response across image, linear low-light response, asynchronous reset, predictable latency from firing request to image acquisition, robust full-control frame grabber driver and camera API, and the ability to modify driver level control of color reconstruction algorithm to optimize for character recognition, among others. However, the system may have some, all, or none of the features. Further, it may have the features together, separately, or in various combinations, among others.

In one exemplary embodiment, the camera may have features such as asynchronous reset, direct TTL line to flash, no moving parts, ⅔" CCD, C-mount lens, 1300×1300 pixels, 30-bit RGB (10 per channel) and a Bayer filter, among others. For example, one such camera may be a camera manufactured by the Digital Video Camera Co., Inc. (DVC) such as a model 1310C normally used in microscopic quality control. However, the camera may take various forms, be various models, and may be manufactured or vended by various vendors. In addition, the system may have a frame grabber with features such as PCI slot, supported linux driver, asynchronous reset, and ability to change Bayer processing filter, among others. For example, one such frame grabber may be that by Engineering Design Team, Inc. (EDT) such as model PCI-DV44. However, the frame grabber may take various forms, be various models, and may have various manufacturers and vendors.

The illumination 132 may take various forms. These forms may include a flash, a street lamp, and an infrared light, among others. Alternately, the system may or may not have illumination 132.

The image scheduling and retrieval system 126 and/or the data integrity manager 116 may also function to crop images, add authentication data, add one or more watermarks, layer watermarks, and add data linking other images and reports, among others. For example, the image scheduling and retrieval system 126 and/or the data integrity manager 116 may function to determine a license plate number from the acquired images. Alternately, the system may function to crop images to minimize file sizes. In another exemplary embodiment, the image scheduling and retrieval system 126 and/or the data integrity manager 116 may add a data bar about the image or practice steganography on the image data. However, various editing functions may be performed by the system. Furthermore, these editing functions may be performed in a back-office.

Figure 8:
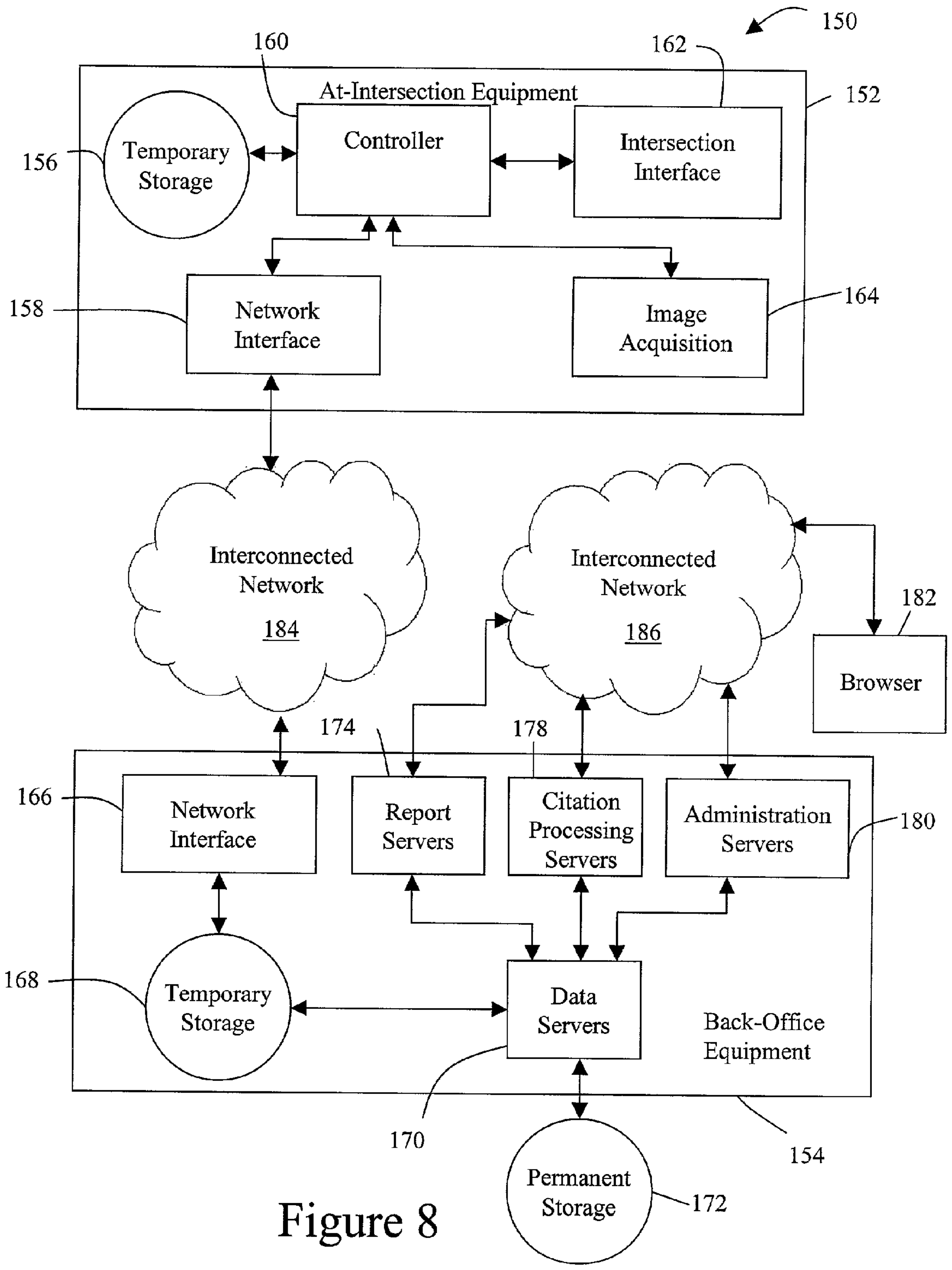
FIG. 8 is a schematic block diagram of an exemplary embodiment of the system as seen in FIG. 1.

FIG. 8 is a schematic block diagram of an exemplary embodiment of the system as seen in FIG. 1. The system 150 may have intersection equipment 152 connected through an interconnected network 184 to back-office equipment 154. Further, the back office equipment 154 may be accessible through an interconnected network 186 by browsers 182.

The at-intersection equipment 152 may include a controller 160, intersection interface 162, image acquisition system 164, temporary storage 156, and network interface 158. The controller 160 may function to gather information and data associated with traffic violations from the intersection interface 162. The controller 160 may then determine whether a violation has or is likely to occur. Further, the controller 160 may schedule images to be acquired for use as evidence of the traffic violation. The controller 160 may direct the image acquisition system 164 to acquire the images. Further, the controller 160 may determine that more than one violation has or is likely to occur and may schedule images to be acquired for use as evidence of one or a combination of the violations. The controller 160 may then store the images temporarily in a temporary storage 156.

Further, the controller 160 may use the network interface 158 to transfer the images, data and packages associated with the traffic violations through an interconnected network 184 to back-office equipment 154. The controller 160 may transfer the data on demand, on a fixed or varying schedule, or as they arrive, among others. In this manner, real-time access may be provided to data. Alternately, the data may downloaded in accordance with network traffic density.

The controller 160 may also collect information associated with traffic. For example, the controller 160 may collect information associated with number of vehicles traversing an intersection. Alternately, the controller may store data associated with weather conditions at the intersection. The weather condition data may be stored or associated with a violation. In another exemplary embodiment, the system may also track traffic information and alert the back-office or a responsible party of a malfunction in the traffic system The controller may then transfer the data to the back-office 154. In this manner, the system may function to provide real-time tracking of engineering metrics, enforcement metrics, and meta-data tracking.

In addition, the controller 160 may receive data associated with configuration. Interaction with the back-office equipment 154 may permit the reporting and/or manipulating of parameters and/or code associated with the functionality of the controller 160. For example, the scheduling of data transfer, parameters associated with image acquisition, parameters associated with image enhancement and/or authentication may be manipulated from a remote location. Further, the network interface 158 associated with the controller 160 may permit communication with a mobile or handheld device. The communication may or may not be wireless. Further, the mobile or handheld device may manipulate the parameters or code associated with the functionality of the controller 160.

The back-office equipment 154 may have a network interface 166, a temporary storage 168, data servers 170, report servers 174, citation processing servers 178, and administration servers 180. In addition, back office equipment 154 may be associated with a permanent storage 172. Data associated with violations may be transferred from the at-intersection equipment 152 through an interconnected network 184 to a network interface 166. The network interface 166 may store the images, data and/or packages associated with traffic violations in a temporary storage 168. Data servers 170 may retrieve the images, data and/or packets from the temporary storage 168. Further, the data servers 170 may store the data in a permanent storage 172. Further, the data servers 170 may be in communication with report servers 174, citation processing servers 178, and administration servers 180. In one exemplary embodiment, the data servers 170 may direct the storage of data in a format that may be queried and configured.

The report servers 174 may permit access to the data by a browser 182 through an interconnected network 186. The report server 174 may show various reports. These reports may include reports associated with intersections, specific violations, and vehicles, among others. Further, the report servers 174 and/or other servers may function to communication with oversight parties, management personnel, enforcement bodies and/or political bodies. Further these servers may function to provide effectivity statistics, oversight reports, maintenance, throughput reports, exception reports, error reports, and delinquent payment reports, among others.

The citation processing server 178 may permit the processing of citations associated with traffic violations. The citation processing server 178 may be accessible by browsers 182 through an interconnected network 186. In this way, various terminals may function to process citations.

The administration server 180 may also be accessible by browsers 182 through the interconnected network 186. The administration server 180 may function to permit various administrative tasks to be performed from a remote browser 182. For example, the administration server 180 may permit configuration of the back-office and/or intersection equipment. The administration server 180 may also permit configuring and monitoring of back-office equipment, user permissions, system administration, and unit administration, among others.

The interconnected network 184 and the interconnected network 186 may be separate networks, the same network, or various combinations of networks, among others. These networks may include global networks, LANs, WANS, wireless networks, and TCP/IP networks, among others. The network interfaces may be compatible with the interconnected network. For example, the network interfaces may take various forms including modems, ethernet cards, wireless modems, and pager connectivity systems, among others.

The system may further function to authenticate packets associated with traffic violations. For example, the controller 160 may, through a network interface 158, and the interconnected network 184 connects to back-office equipment 154. The controller may acquire authentication data and/or keys to be used in authenticating and/or encrypting packets, data and images associated with the traffic violations. Further, the controller 160 may synchronize clocks with the back office equipment 154.

However, the back-office may also authenticate data. Further, the back-office may enhance images, add watermarks, add authentication data, crop images, confirm authentication, and write to a write-once media, among others. Servers associated with the back-office 154 may also practice steganography and/or add multiple watermarks. In this manner, data integrity and authenticity may be further assured. The back-office may also process images to obtain data such as license plates. Further, the back-office may retrieve data encoded through steganography.

The permanent storage 172 may take various forms. These forms may include hard drives, database systems, removable media systems, tape drives, optical media, and write-once media, among others. For example, the permanent storage may be a write-once media. With the write once media, data may be stored in a tamper resistant format.

The temporary storage 156, 168 may take various forms. These forms may include RAM, hard drives, floppy drives, and cache memory, among others.

The various servers may take varying forms. These forms may include database servers, web-based servers, and file servers, among others. Further, these servers may operate using various operating systems including Windows NT, Windows 2000, Linux, BSD, Mac OS X, and UNIX, among others.

However, the system 150 may have all, some or none of these elements or various combinations of these elements, among others. Further, these elements may be housed and/or contained together, separate or in various combinations, among others. As such, various embodiments may be envisaged.

In one exemplary embodiment, output of a violation event may be a data file or files, and may also be a variable number of image files. Embedded in each image file may be a watermark containing a checksum of the executable program as it resides in memory (either or both the data or code segments), or as it resides on disk. Optionally, also embedded in each image file is a checksum of the associated data file or files. Further, there may also be embedded in each image file a checksum of all other associated image files. These checksums may be generated using CRC32, SHA, MD5, Snefru, or other means. There may also be embedded a unique token or key generated by a disinterested third party or location, which uniquely and independently identifies the time at which the data file or files or image file or files were generated.

The generated data file or files, and image file or files may be transmitted to the back office location via an encrypted link, possibly using PKI validation. The data file or files, or image file or files may or may not be transmitted to, or ultimately reside on the same permanent storage unit. The location and/or association of these data file or files, or image file or files maybe maintained by a independent data storage system.

Upon arrival at the back office another unique token or key may be generated by a disinterested third party to uniquely and independently identify the time of arrival. The generated data file or files, and image file or files may then be copied to write-only media, which may then be escrowed by a disinterested third party or location.

Upon arrival at the back office, the generated data file or files, image file or files may be interpreted, scaled, sharpened, cropped, composited, or otherwise enhanced. The resultant data file or files or image file or files may then be embedded with watermarks that may identify their original source, in a manner which may reference the original executable program, other original associated image file or files, other original associated data file or files, and/or unique token or key generated by a disinterested third party.

At a later time, the checksums of the data file or files, or image file or files, either original or enhanced, may be regenerated and compared to the embedded checksums. Also, the embedded checksum of the executable program may be compared to the known checksum of that version of executable programs. Further, the unique tokens or keys generated by a third party may be compared to that third party's history of token or key generation. Discrepancies may be noted or acted upon.

Figure 9:
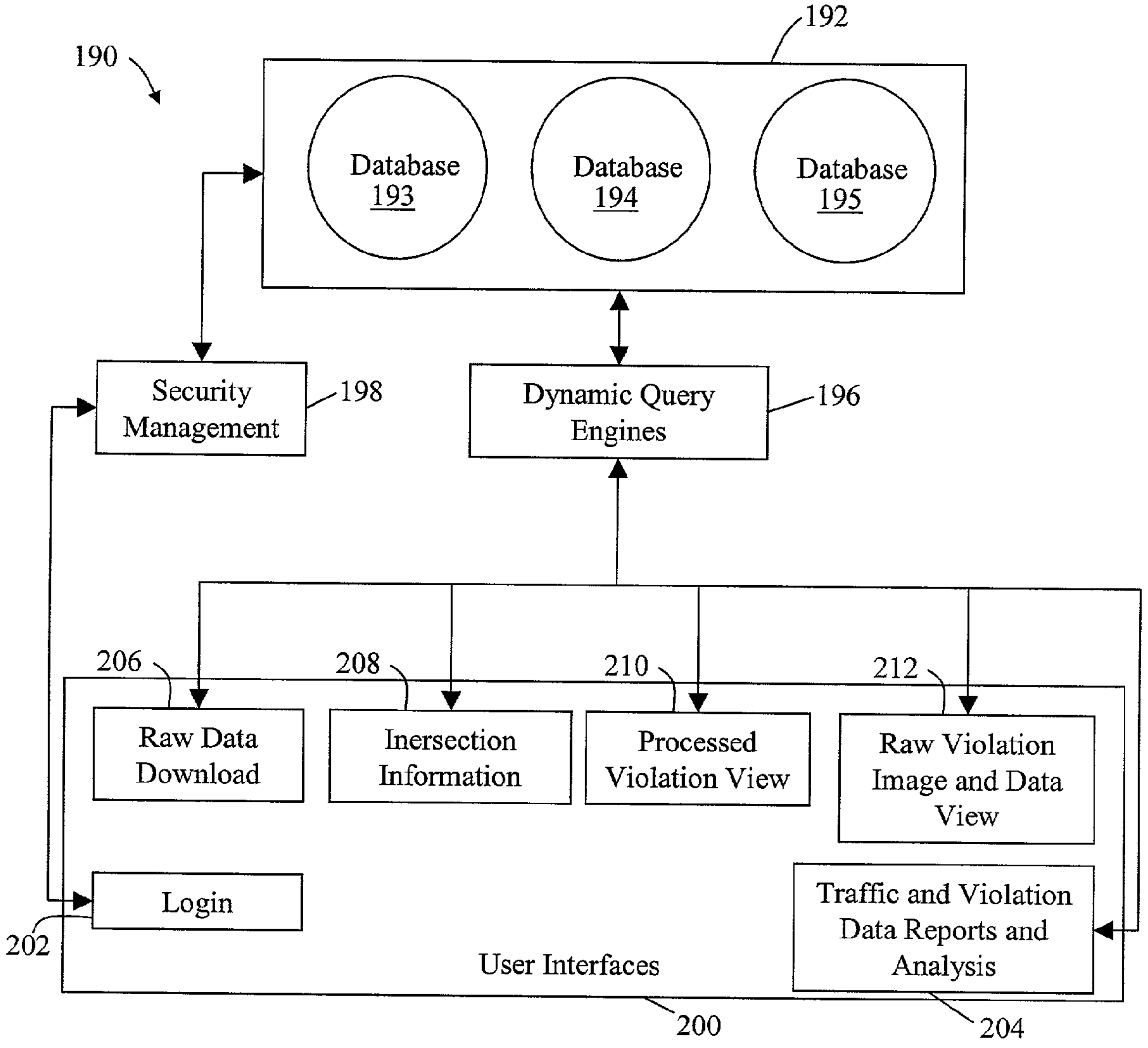
FIG. 9 is a schematic block diagram of an exemplary embodiment of the system as seen in FIG. 1.

FIG. 9 is a schematic block diagram of another exemplary embodiment of the system as seen in FIG. 1. In the system 190, a collection of databases 192 is accessible by a user interface 200 through a security management system 198 and a dynamic query engine 196.

The user interfaces 200 may include a login 202, a raw data download 206, intersection information 208 processed violation views 210, raw violation image and data views 212 and traffic violation data reports and analysis 204. The login 202 may function with the security management system 198 to limit access to the collection of databases 192 to authorized users. The raw data download 206 may function to transfer information to and from the database collection 192 through a dynamic query engine 196. The raw data may take various forms. These forms may include the data packets and query results, among others.

The intersection information 208 may also download or transfer data to and from the collection of databases 192 through a dynamic query engine 196. The intersection information 208 may include, for example, reports and/or query results comprising information associated with an intersection.

The processed violation view 210 may also function to transfer data to and from the collection of databases 192 through the dynamic query engine 196. For example, the dynamic query engine 196 may dynamically generate queries. In one exemplary embodiment, the dynamic query engine 196 may be a script or code running in association with a browser, generating queries in response to user interaction. The processed violation view may include information associated with the violation for which a citation has been issued or to cite upon. The process violation view 210 may take various forms. These forms may include reports and/or query results associated with the status, nature, and data, among others, associated with a specific violation.

Raw violation image and data view 212 may take various forms. These forms may include raw data, images, and query results, among others.

Traffic and violation data reports and analysis 204 may take various forms. These forms may include reports including broad statistics and data associated with intersections, regions, violation type, and violation data, among others.

Figure 10:
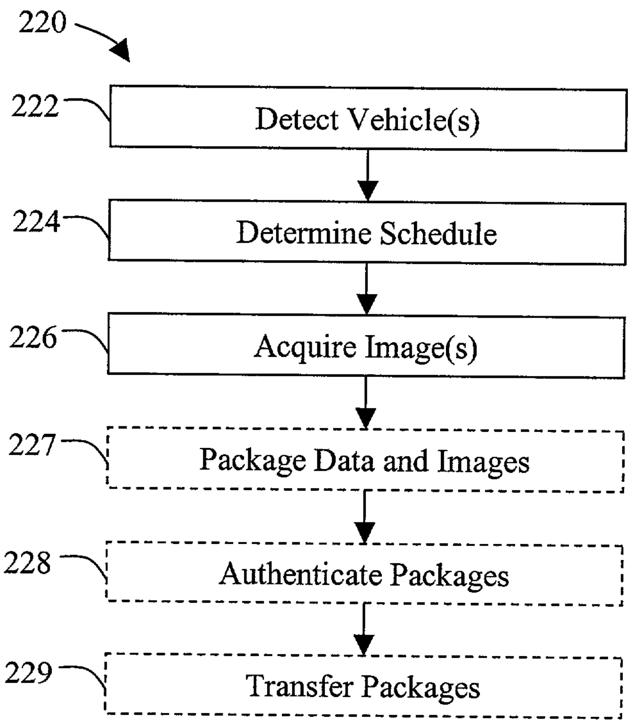
FIG. 10 is a block flow diagram of an exemplary method for use in the system as seen in FIG. 1.

FIG. 10 is a block flow diagram of an exemplary method for use by the system of FIG. 1. In the method 220, a vehicle or vehicles are detected by sensors as seen in a block 222. A controller may then use data associated with the vehicles and/or sensors to determine a schedule for acquiring images, as seen in a block 224. Further, the controller may use traffic signal data and other data to determine the preferred schedule.

The controller may then direct an image acquisition system to acquire the image or images according to the schedule, as seen in a block 226. In addition, the controller may acquire the image or images and data from the image acquisition system. The controller may optionally package the data and/or images in a data packet, as seen in a block 227.

Further, the controller may optionally authenticate and or encrypt the data, images, and/or data packet as seen in a block 228. The controller may, for example, time stamp images, time stamp data packets, watermark, use a PKI system, and authenticate with a remote system, among others.

The controller may also optionally transfer the data, images, and/or data packets to a remote location. The transfer may, for example, occur as the data is acquired, on a fixed or varying schedule, or on command, among others.

Figure 11:
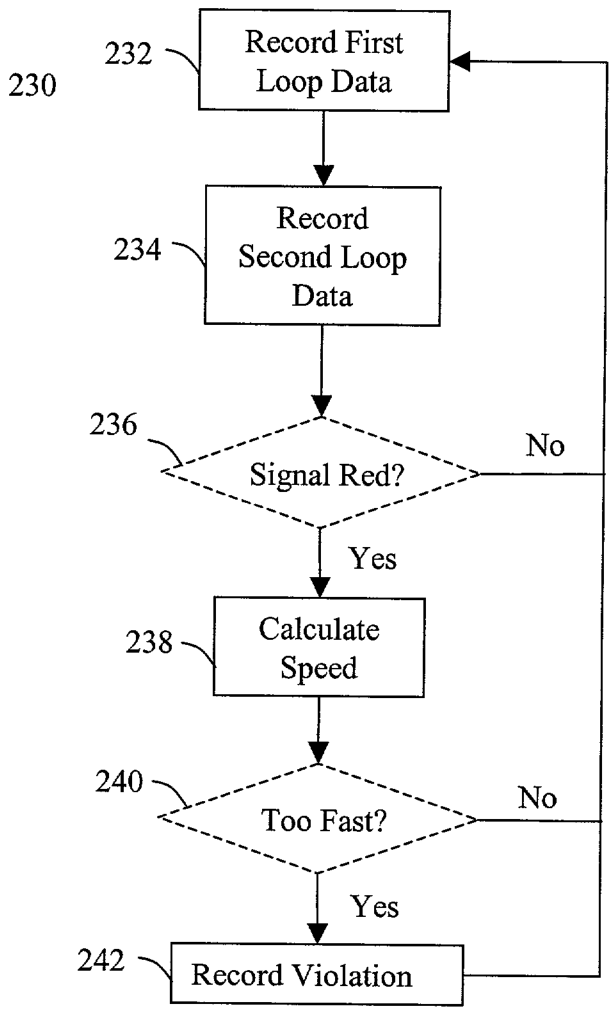
FIG. 11 is a block flow diagram of an exemplary method for use by the system as seen in FIG. 1.

FIG. 11 is a block flow diagram of an exemplary method 230 for use by the system as seen in FIG. 1. The method 230 may function to gather images and evidence associated with traffic violations. In this exemplary method, two loop sensors are associated with a lane of traffic. A first loop sensor data may be acquired as seen in a block 232. This data may include activation and deactivation times associated with the presence of a vehicle, among others.

Next, data may be collected in association with a second sensor loop as seen in a block 234. This data may also take various forms. These forms may include activation times and deactivation times, among others.

In the case of a traffic signal, the method may determine whether a signal is red as seen in a block 236. However, determining whether a signal is red may or may not be included in the method. If a signal is red, then a speed of a vehicle may be calculated as seen in a block 238. If the signal is not red, however, the method may loop back in search of information from a first sensory loop as seen in block 232.

A speed of a vehicle may be calculated as seen in the block 238. The speed may be used in determining whether a speeding violation has occurred, whether a car is likely to enter an intersection during a red light, or, as evidence for use in an accident report. The speed may be calculated from the data associated with the first loop and/or the data associated with the second loop. For example, if a distance is known between and first loop and a second loop, the difference in activation times or the difference in deactivation times, may be used in determining a speed of a vehicle. Further, a set of data including activation and deactivation times for both the loops may be used in determining vehicle size, vehicle velocity, and/or the vehicle acceleration, among others.

For example, the system may determine the magnitude of a velocity by comparing activation times for sensors separated by a known distance. Furthermore, the system may determine acceleration. For example, the system may compare the time difference between the activation of two loops to the time difference between the deactivation of the same two loops. Alternately, the system may compare the period of activation of one loop to that of another. However, various methods may be envisaged.

The system may then determine whether the vehicle is traveling at an excess speed as seen in a block 240. However, the step of determining whether the speed is excessive may or may not be included in the method. For example, once the speed is calculated, it may be determined that the car cannot stop before entering into an intersection for which the light is red. Alternately, the speed may be compared to a posted speed limit. If the speed is excessive, a violation record may be created as seen in block 242. If the speed is not excessive, the method may return to search for data associated with the first sensor loop as seen in block 232.

In the event that the speed is excessive, a violation may be recorded as seen in a block 242. Recording a violation may include scheduling images to be taken by an image acquisition system. Gathering data and/or images to be packaged in association with a traffic violation, recording the violation may also include encrypting and/or authenticating data, images and/or packets, among others, associated with traffic violations. Furthermore, recording a violation may include various artificial intelligences, such as determining the license plate number of a vehicle associated with the traffic violation and/or accident.

Figure 12:
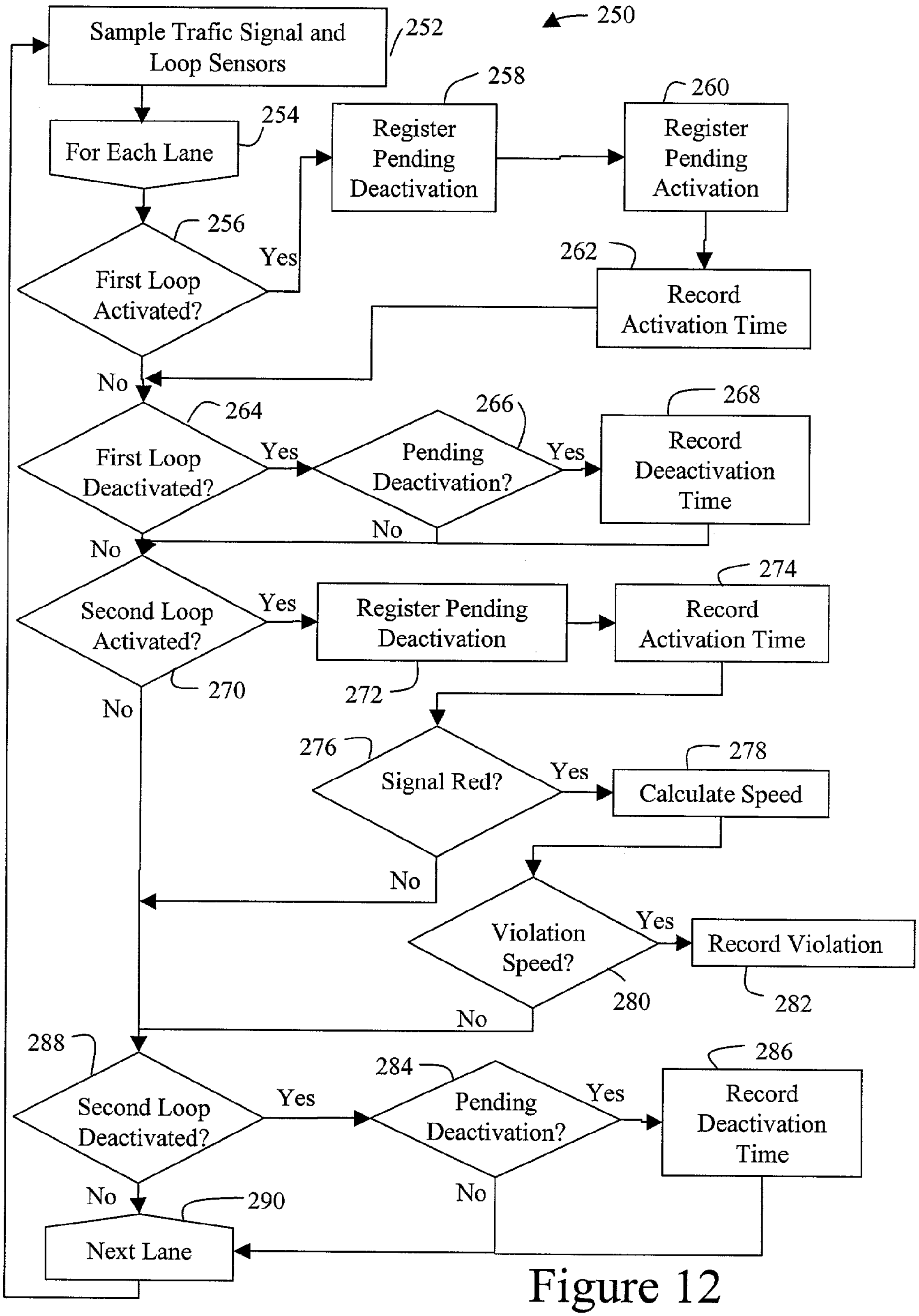
FIG. 12 is a block flow diagram of an exemplary method for use by the system as seen in FIG. 1.

FIG. 12 is a block flow diagram of an exemplary method for use by the system as seen in FIG. 1. In the method of 250, traffic signals and loop sensors may be sampled, as seen in a block 252. For each lane, the method may then act to determine whether a violation has occurred or is likely to occur and schedule the gathering of data or images associated with that violation. In this exemplary method, a first sensory loop may be activated as seen in a block 256. Once the sensory loop is activated, the system may register a pending deactivation as seen in a block 258. The pending deactivation may be of the first loop sensor. Next, the system may register a pending activation of a second loop as seen in a block 260. The system may then record the activation time of the first loop and/or the second loop.

The first loop may then deactivate once the vehicles has passed. Once the first loop deactivates, it is determined whether a deactivation was registered, as seen in a block 266. If the deactivation was registered, the deactivation time may be recorded as seen in a block 268. However, if the deactivation of the loop was not registered, the method may return to determine whether a second loop is activated as seen in a block 270.

If the second loop is activated, the method 250 may register a pending deactivation of the second loop as seen in a block 272. The activation time may also be recorded as seen in a block 274.

The state of the signal may be determined as seen in a block 276. If the signal is red, the speed of the vehicle may be calculated as seen in a block 278. For example, the speed may be calculated using the data recorded above.

If the speed exceeds a minimum speed, a violation may be recorded and/or scheduled as seen in a block 282. For example, the minimum speed may represent a speed above which a vehicle is unlikely to stop for a red light.

However, if the speed is not excessive or if the light is not red, the system may determine if the second loop is deactivated and record the deactivation time as seen in the blocks 288 284 286.

This process may be repeated for each lane. Further, these steps may or may not be included. Moreover, these steps may be rearranged, excluded, or configured in various flow arrangements, among others.

With this method, false positive violations may be eliminated if one or more loops is not deactivated. As a result, data storage and bandwidth may be reduce in addition to a reduction in processing labor costs. However, various other methods may be envisaged for use with the system.

Figure 13:
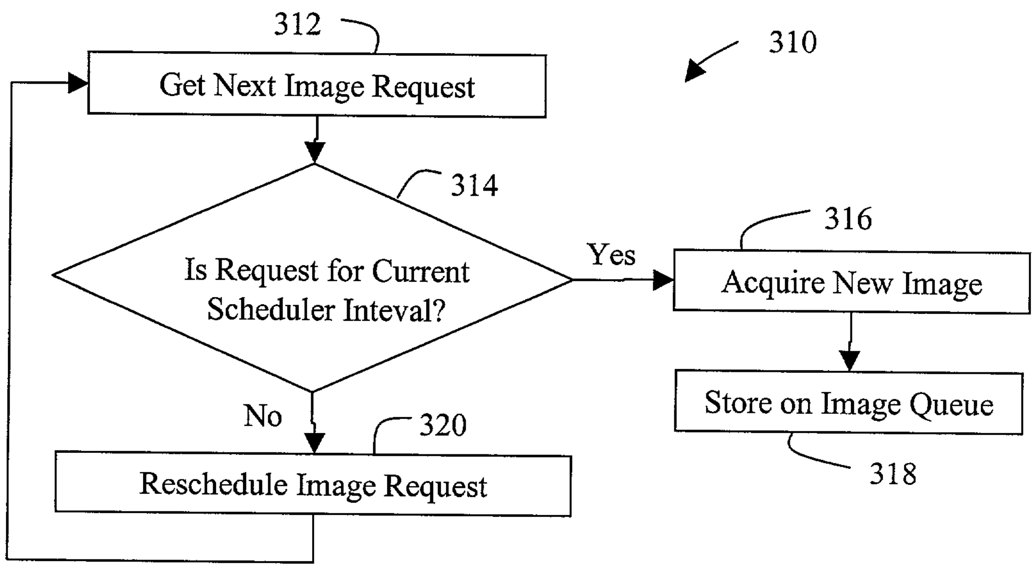
FIG. 13 is a block flow diagram of an exemplary method for use by the system as seen in FIG. 1.

FIG. 13 is a block flow diagram of an exemplary embodiment of a method for use in a system as seen in FIG. 1. In this exemplary method 310, the image acquisition system may be directed to acquire a new image as seen in a block 312. The image acquisition system may determine whether the scheduled image is to be taken for the current scheduler interval as seen in a block 314. If the image is scheduled for the current interval, the image acquisition system may then acquire a new image as seen in a block 316. Further, the image acquisition system may store the image on an image cue as seen in a block 318. The system may retrieve the image at a later time. If the requested image is not to be taken during the current scheduler interval, the image acquisition system may reschedule the image as seen in a block 320. The schedule request may then be directed to the next image request as seen in a block 312.

Figure 14:
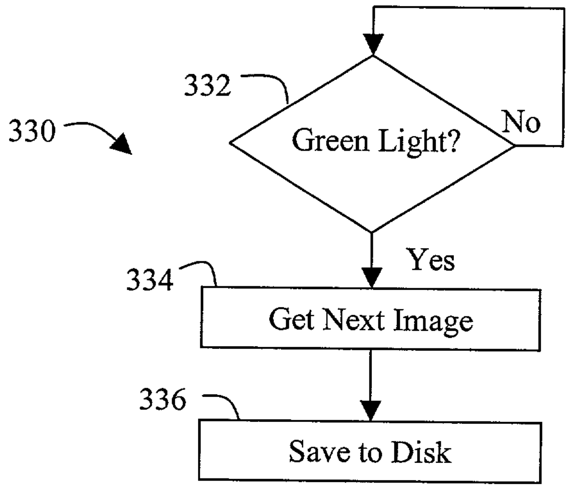
FIG. 14 is a block flow diagram of an exemplary method for use by the system as seen in FIG. 1.

FIG. 14 is a block flow diagram of another exemplary method for use by the system as seen in FIG. 1. The method 330 may be used to download images at a time when a violation is unlikely to occur. For example, a traffic system designed to detect red light violations. Images may be stored on an image cue during a red light. The method 330 may then direct that when a light is green as seen in a block 332, the controller is directed to acquire the next image as seen in a block 334 from the image cue. If, however, the light is not green, then the system waits or pauses until the light becomes green. Once the image is acquired from the image cue, as seen in a block 334, the image may be saved into temporary storage as seen in a block 336 or packaged, encrypted, and/or authenticated, among others.

Figure 15:
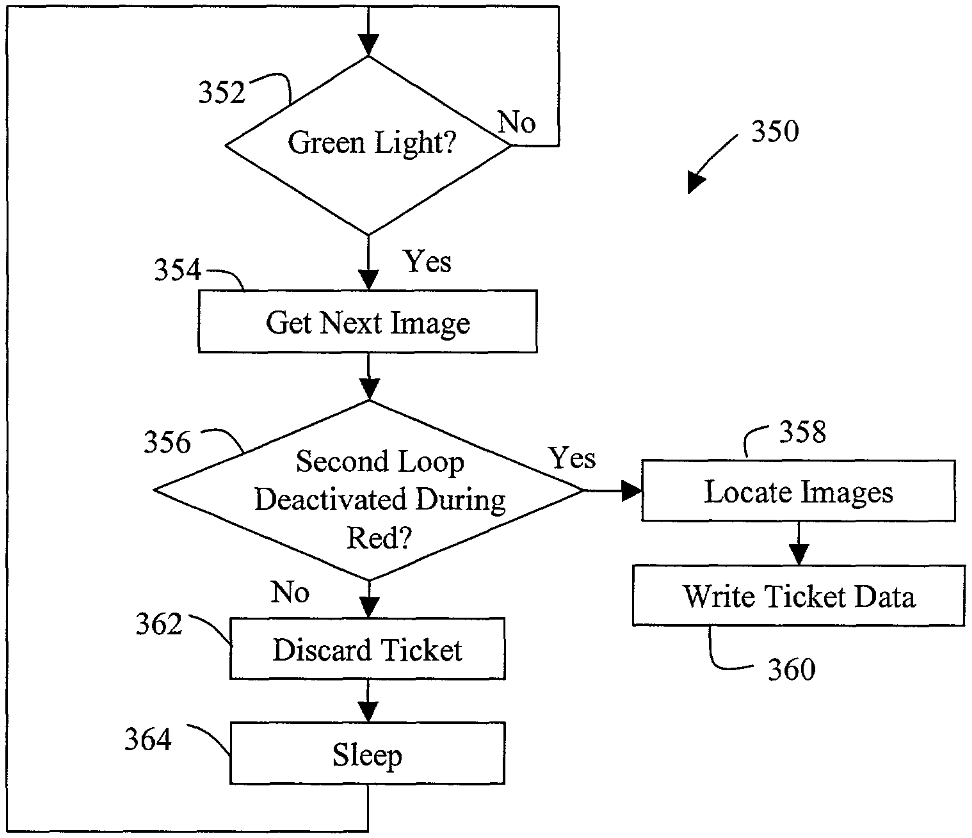
FIG. 15 is a block flow diagram of an exemplary method for use by the system as seen in FIG. 1.

FIG. 15 is a block flow diagram of a further exemplary method for use by the system as seen in FIG. 1. The method 350 may be used in building a traffic violation report or package. In this case, once a light turns green, as seen in a block 352, the images are acquired from the image cue as seen in a block 354. As the images are acquired and associated with a traffic or potential traffic violation, it is determined whether a second loop was deactivated during a red light as seen in a block 356. The deactivation of the second loop during a red light is an indication that the vehicle passed into the intersection during the red light. The system then locates the images as seen in a block 358 and writes the ticket data as seen in a block 360. Writing the ticket may include authenticating and encrypting and validating the image data. Further, it may include storing the image data on a temporary storage and/or transferring the data images or packets associated with the traffic violation to a remote location. If, however, a second loop was not deactivated during the red light the system may determine that a traffic violation did not occur. As such, a system may discard the ticket data images or packets associated with the expected traffic violation as seen in a block 362. The system may sleep as seen in a block 364 in anticipation of a subsequent red light.

Figure 16:
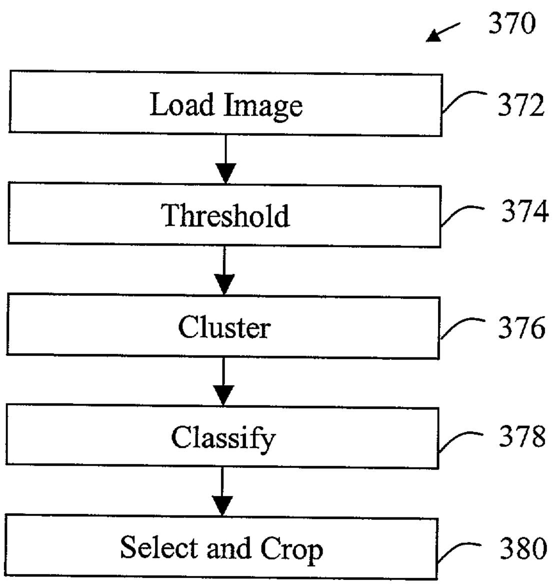
FIG. 16 is a block flow diagram of an exemplary method for use by the system as seen in FIG. 1.

FIG. 16 is a block flow diagram of a further exemplary method for use by the system as seen in FIG. 1. The method 370 may be used to acquire a specific image data associated with a traffic violation. The method 370 may be performed by the controller or by a back office system.

For example the system may load an image associated with a traffic violation as seen in a block 372. The system may threshold the image or search the image for thresholds as seen in a block 374. The system may then look for clusters within the image as seen in a block 376. Further, the system may classify these clusters as seen in a block 378. The system may then select and crop the image as seen in a block 380. In this manner, the system may, for example, focus in on and crop an image to display the license plate of a vehicle. Further, the system may perform optical character recognition to determine the characters of the license plate or other identifying markings.

Figure 17:
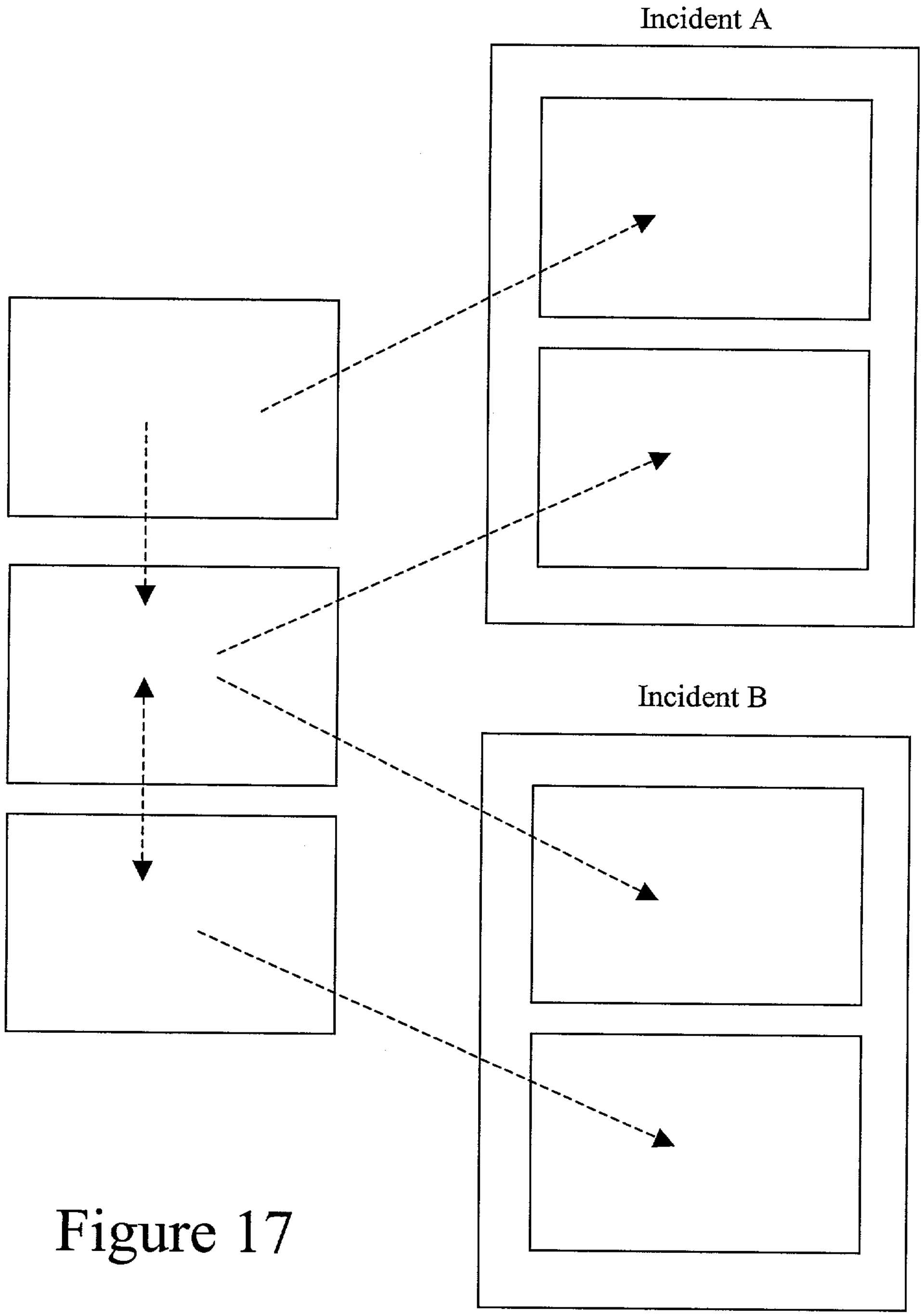
FIG. 17 is a schematic block diagram of an exemplary embodiment associated images, according to the invention.

FIG. 17 is a schematic block diagram of an exemplary embodiment associated images, according to the invention. In this exemplary embodiment, the images may be associated with one or more incidents. In addition, the images may be associated with each other. For example, the images may be associated with each other in a single direction or in two directions. The association may be one-to-another or mutual. This association may be embodied as data. The data may be incorporated with the image. Alternately, the data may be stored in a data file and/or record. The data file and/or record may be stored in a database or packaged with the image or images. Further, the data may incorporate authentication data, timestamps, and violation data, among others.

In addition, many images may be mapped to one incident. Alternately, an image may be mapped to many incidents. For example, one image may be used in more than one violation report.

As such, a system and method for automated detection and processing of traffic violations is described. In view of the above detailed description of the present invention and associated drawings, other modifications and variations will now become apparent to those skilled in the art. It should also be apparent that such other modifications and variations may be effected without departing from the spirit and scope of the present invention as set forth in the claims which follow.

The invention claimed is:

1. An apparatus for capturing an image associated with multiple violators, the apparatus comprising:

a controller;

one or more non-optical sensors communicatively coupled to said controller, said one or more non-optical sensors adapted to detect at least a first vehicle and a second vehicle;

said controller adapted to use data associated with said one or more non-optical sensors to determine a schedule for acquiring one or more images associated with a first violation associated with said first vehicle and a second violation associated with said second vehicle, wherein to determine the schedule, the controller is further configured to:

determine a first time that a first image depicting the first violation associated with the first vehicle can be acquired;

determine a second time that a second image depicting the second violation associated with the second vehicle can be acquired; and determine a third time, different from the first time and the second time, that a third image depicting both said first violation and said second violation can be acquired; and an image acquisition system communicatively coupled to said controller, said image acquisition system adapted to acquire said one or more images associated with said first violation and said second violation, said image acquisition system adapted to acquire said one or more images in compliance with said schedule, wherein the controller is further configured to instruct the image acquisition system to acquire the third image at the third time.

2. The apparatus of claim 1, the apparatus further comprising:

a traffic signal interface communicatively coupled to said controller, said controller adapted to use data associated with said traffic signal interface to determine said schedule.

3. The apparatus of claim 1 wherein at least one of said first violation and said second violation is associated with traversing a red traffic signal.

4. The apparatus of claim 1 wherein at least one of said first violation and said second violation is associated with exceeding a speed.

5. The apparatus of claim 1 wherein said one or more images comprise evidence of a collision.

6. The apparatus of claim 1 wherein said controller creates a data package comprising said data and at least one of said one or more images, the data package being associated with one of said first vehicle and said second vehicle.

7. The apparatus of claim 1, the apparatus further comprising:

a network interface communicatively coupled to said controller, said controller transferring data packages through said network interface.

8. A method for capturing an image associated with multiple violators, the method comprising:

detecting at least a first vehicle and a second vehicle with one or more non-optical sensors;

determining with a controller a schedule for acquiring one or more images that are associated with a first violation associated with said first vehicle and a second violation associated with said second vehicle, said controller using data associated with said one or more non-optical sensors in determining said schedule, wherein determining said schedule comprises:

determining a first time that a first image depicting the first violation associated with the first vehicle can be acquired;

determining a second time that a second image depicting the second violation associated with the second vehicle can be acquired; and determining a third time, different from the first time and the second time, that a third image depicting both said first violation and said second violation can be acquired; and acquiring said one or more images associated with said first violation and said second violation in compliance with said schedule, wherein acquiring the one or more images comprises acquiring the third image at the third time.

9. The method of claim 8 wherein said controller uses data associated with a traffic signal interface in determining said schedule.

10. The method of claim 8 wherein at least one of said first violation and said second violation is associated with traversing a red traffic signal.

11. The method of claim 8 wherein at least one of said first violation and said second violation is associated exceeding a speed.

12. The method of claim 8 wherein said one or more images comprise evidence of a collision.

13. The method of claim 8, the method further comprising:

associating one of said one or more images with a time stamp.

14. The method of claim 8, the method further comprising:

assembling a data package comprising said data and at least one of said one or more images.

15. The method of claim 8, the method further comprising:

transferring data packages from said controller to a remote location.

16. A method for capturing multiple images associated with a first violation, the method comprising:

detecting a first vehicle associated with the first violation with one or more non-optical sensors;

determining with a controller a schedule for acquiring the multiple images associated with the first vehicle associated with the first violation, said controller using data associated with said one or more non-optical sensors in determining said schedule, wherein the schedule for at least one image of the multiple images is determined using data associated with a second violation associated with a second vehicle, wherein determining the schedule comprises:

determining a first time that a first image depicting the first violation associated with the first vehicle can be acquired;

determining a second time that a second image depicting the second violation associated with the second vehicle can be acquired; and determining a third time, different from the first time and the second time, that a third image depicting both said first violation and said second violation can be acquired; and acquiring said multiple images associated with the first violation, wherein the multiple images are associated with multiple locations of the first vehicle, wherein acquiring the multiple images comprises acquiring the third image at the third time.

17. The method of claim 16 wherein said controller uses data associated with a traffic signal interface in determining said schedule.

18. The method of claim 16 wherein the first violation is associated with traversing a red traffic signal.

19. The method of claim 16 wherein the first violation is associated exceeding a speed.

20. The method of claim 16 wherein said multiple images comprise evidence of a collision.

21. The method of claim 16 the method further comprising: associating one of said multiple images with a time stamp.

22. The method of claim 16 the method further comprising: assembling a data package comprising said data and at least one of said multiple images.

23. The method of claim 16 the method further comprising: transferring data packages from said controller to a remote location.

24. A program storage device readable by a machine, tangibly embodying a program of instruction executable by the machine to perform method steps for capturing an image associated with multiple violators, the method steps comprising:

detecting at least a first vehicle and a second vehicle with one or more non-optical sensors;

determining with a controller a schedule for acquiring one or more images that are associated with a first violation associated with said first vehicle and a second violation associated with said second vehicle, said controller using data associated with said one or more sensors in determining said schedule, wherein determining said schedule comprises:

determining a first time that a first image depicting the first violation associated with the first vehicle can be acquired;

determining a second time that a second image depicting the second violation associated with the second vehicle can be acquired; and determining a third time, different from the first time and the second time, that a third image depicting both said first violation and said second violation can be acquired; and acquiring said one or more images associated with said first violation and said second violation in compliance with said schedule, wherein acquiring the one or more images comprises acquiring the third image at the third time.

25. An apparatus for capturing at least two images associated with a first violation associated with a first vehicle, the apparatus comprising:

a controller;

at least one non-optical sensor operably coupled to the controller, wherein the at least one non-optical sensor is configured for detecting at least the first vehicle approaching an intersection and to generate and transmit to the controller at least one signal corresponding to the detecting:

wherein the controller is configured to determine, based on the at least one signal received from the sensor, a first schedule for acquiring a first image of the first vehicle at a first moment when the first vehicle has not yet entered the intersection; and determine, based on the signal received from the sensor, a second schedule for acquiring a second image of the first vehicle at a second moment when the first vehicle has entered the intersection, wherein at least one of said first schedule and said second schedule is determined using data associated with a second violation associated with a second vehicle, wherein to determine at least one of the first and second schedules, the controller is further configured to:

determine a first time that an image depicting the first violation associated with the first vehicle can be acquired;

determine a second time that an image depicting the second violation associated with the second vehicle can be acquired; and determine a third time, different from the first time and the second time, that at least one image showing depicting both said first violation and said second violation can be acquired; and an image capture device operably coupled to the controller, configured to capture the first image according to the first schedule and to capture the second image according to the second schedule, wherein at least one of the first image and the second image is the at least one image depicting both the first violation and the second violation and is captured at the third time.

26. A method for capturing images of a red light violation associated with a first vehicle, the method comprising the steps of:

via a non-optical sensor, detecting the first vehicle moving toward an intersection;

ascertaining the state of a traffic control signal governing the first vehicle in relation to the intersection;

determining, based on the steps of detecting and ascertaining:

a schedule for capturing a first image at a first moment when the first vehicle has not yet entered the intersection and the state of the traffic control signal is red;

a schedule for capturing a second image at a second moment when the first vehicle has entered the intersection and the state of the traffic control signal is red;

a first time that an image depicting the red light violation associated with the first vehicle can be acquired;

a second time that an image depicting a moving violation associated with a second vehicle can be acquired; and a third time, different from the first time and the second time, that at least one image depicting both the red light violation and the moving violation can be acquired; and capturing the first and second images, wherein at least one of the first image and the second image is the at least one image depicting both the red light violation and the moving violation and is captured at the third time.

27. A method for capturing images of a red light violation associated with a first vehicle, the method comprising the steps of:

via a non-optical sensor, detecting a first vehicle moving toward an intersection;

ascertaining the state of a traffic control signal governing the first vehicle in relation to the intersection;

determining, based on the steps of detecting and ascertaining, a schedule for capturing a plurality of images, wherein at least one of the plurality of images is scheduled to be captured at a first moment when the first vehicle has not yet entered the intersection and the state of the traffic control signal is red and at least one other of the plurality of images is scheduled to be captured at a second moment when the vehicle has entered a predetermined distance into the intersection and the state of the traffic control signal is red, wherein determining the schedule comprises:

determining a first time that a first image depicting the red light violation associated with the first vehicle can be acquired;

determining a second time that a second image depicting a moving violation associated with a second vehicle can be acquired; and determining a third time, different from the first time and the second time, that a third image depicting both the red light violation and the moving violation can be acquired; and capturing the plurality of images based on the schedule, wherein at least one of the plurality of images is the third image depicting both the red light violation and the moving violation and is captured at the third time.

* * * * *